United States Patent [19]

Uchikawa

[11] Patent Number: 4,570,095
[45] Date of Patent: Feb. 11, 1986

[54] MECHANICAL AMPLIFICATION MECHANISM COMBINED WITH PIEZOELECTRIC ELEMENTS

[75] Inventor: Tadao Uchikawa, Tokyo, Japan

[73] Assignee: NEC Corporation, Tokyo, Japan

[21] Appl. No.: 659,354

[22] Filed: Oct. 10, 1984

[30] Foreign Application Priority Data

Oct. 11, 1983 [JP] Japan .................................. 58-189515

[51] Int. Cl.⁴ ............................................. H01L 41/08
[52] U.S. Cl. ...................................................... 310/328
[58] Field of Search ................. 310/323, 328; 400/124; 101/93.04, 93.05

[56] References Cited

U.S. PATENT DOCUMENTS

| | | | |
|---|---|---|---|
| 3,405,289 | 10/1968 | Gikow | 310/328 |
| 3,558,936 | 1/1971 | Horan | 310/328 X |
| 3,649,857 | 3/1972 | Knappe | 310/328 X |
| 4,193,703 | 3/1980 | Sakmann | 310/328 X |
| 4,318,023 | 3/1982 | O'Neill et al. | 310/328 |
| 4,435,666 | 3/1984 | Fukui et al. | 310/328 |
| 4,460,840 | 7/1984 | Weiger et al. | 310/328 |

FOREIGN PATENT DOCUMENTS 0608206  4/1978  U.S.S.R. ............................... 310/328

OTHER PUBLICATIONS

Piezo Stroke Amplifier for Matrix Printers, by W. Sakmann, *IBM Technical Disclosure Bulletin*, vol. 20, No. 6, Nov. 1977, p. 2263.

*Primary Examiner*—Mark O. Budd
*Attorney, Agent, or Firm*—Laff, Whitesel, Conte & Saret

[57] ABSTRACT

A mechanical amplification structure has a pair of L-shaped lever arms mounted for rotational motion about individually associated pivot points on a frame. An elongated transducer (e.g. piezoelectric or electrostrictive) expands or contracts responsive to electrical signals, the transducer being coupled to swing the lever arms about the pivot points. Thus an excursion distance between the swinging ends of the lever arms is equal to the expansion or contraction of the transducer multiplied by an effective length of the lever arms. An elastic support is coupled between the swinging ends of the arms to experience controlled mechanical excursions responsive to the electrical signals. A mechanical actuator is mounted on the elastic support for giving a mechanical action in response to an operation of the actuator means. As shown, the actuator is a printing needle in one embodiment and a relay contact in another embodiment.

17 Claims, 6 Drawing Figures

4,570,095

MECHANICAL AMPLIFICATION MECHANISM COMBINED WITH PIEZOELECTRIC ELEMENTS

BACKGROUND OF THE INVENTION

The present invention relates to a mechanical amplification mechanism for amplifying a motion of electromechanical transducer elements. More particularly, the invention relates to a mechanical amplification mechanism which amplifies a displacement by employing either elecrostrictive or piezoelectric elements as a driving source and which is principally used for printing means and switches.

A mechanical amplification mechanism of this kind has been used especially as a printing means of a printer and switches of a relay, etc. In recent years, a printing mechanism has been considered in which power dissipation and the quantity of heat generation are reduced by employing either electrostrictive or piezoelectric elements as a driving source. This mechanism is capable of high-speed operation. In this mechanism, it is necessary to amplifiy the slight displacement of the piezoelectric elements (e.g. 0.005 mm–0.01 mm) so that a sufficient printing needle stroke can be obtained for the printing mechanism (about 0.5 mm).

To this end, a piezoelectrically driven printing mechanism is shown and described in the U.S. Pat. No. 4,193,703 entitled "Matrix Printer with Piezoelectrically Driven Printing Needles." This patent was issued to Walter Sakmann on Mar. 18, 1980. In the mechanism of this patent, both ends of a buckling spring are fixed to holding elements. One of these elements is seated on a piezoelectric crystal device and the other is seated on a fixed holding portion. The buckling spring is deflected by exciting the piezoelectric crystal, to drive a printing needle which is attached to the central part of the buckling spring.

In such a mechanism, depending on deflecting the buckling spring, however, the magnitude of deflection δ of the central part of the buckling spring is geometrically approximated to $$\delta = \frac{2}{\pi} \sqrt{l\epsilon}$$

where $\epsilon$ denotes the displacement of the piezoelectric crystal and $l$ the length of the buckling spring. Assuming that $\epsilon = 0.01$ mm by way of example, it is not possible to make $\delta = 0.5$ mm unless $l = 60$ mm. Moreover, a force acts on the fixed holding portion due to the elongation of the piezoelectric crystal. The fixed holding portion is deformed to open outwardly, so that the displacement to be transmitted to the buckling spring 6 suffers a loss. After all, the length of the spring must be 100 mm or greater. Accordingly, this structure has the disadvantage that the size of the printing mechanism becomes large.

To solve this problem, I have previously described a mechanical amplification mechanism which is disclosed in U.S. patent application Ser. No. 593,981. In this mechanism, two lever arms are fixed to both ends of a piezoelectric element. These arms extend at a right angle to the expanding and contracting direction of the piezoelectric element. Free ends of those two arms hold a band spring therebetween. The band spring has an acting element such as a printing needle or switch terminal at its central portion. The two lever arms are rotatably supported at a fulcrum locating between their fixed end and their free end. Accordingly, the two lever arms turn around the fulcrums by an expansion of the piezoelectric element, so that their free ends approach each other. As a result, the two lever arms bend the band spring, thus causing the acting element to be driven in the direction perpendicular to the expanding direction of the piezoelectric element.

According to this mechanism, the expansion of the piezoelectric element is amplified by the lever arms and the band spring. Therefore, a sufficient acting element stroke (about 0.6 mm) which is necessary for a printer head or a relay can be obtained by a small-sized mechanism. However, this mechanism still has the disadvantage that the piezoelectric element may be broken during the operation of the two lever arms because those lever arms impose bending forces upon the piezoelectric element, with the force acting in the direction perpendicular to the expanding direction, when the arms are turned.

SUMMARY OF THE INVENTION

Therefore, an object of the present invention is to provide a small size mechanical amplification mechanism which has a large amplification factor and which imposes no bending force upon the electrostrictive or piezoelectric element.

In accordance with the invention, a mechanical amplification mechanism having an electrostrictive or piezoelectric transducer element is fixed to a base member at one end of the element in the expanding and contracting direction. Two lever arms are engaged with the other end of the electrostrictive or piezoelectric element for converting an expanding and contracting motion of the element into a motion rotating about a fulcrum. The rotations of the lever arms become symmetrical about the longitudinal center axis of the electrostrictive or piezoelectric element. A belt-like elastic member having an acting element is provided between free ends of those two lever arms.

BRIEF DESCRIPTION OF THE DRAWINGS

The above-mentioned and other objects, features and advantages of the invention will be better understood from the following detailed description of preferred embodiments taken in conjunction with the accompanying drawings, wherein.

DESCRIPTION OF THE PREFERRED EMBODIMENTS

Figure 1:
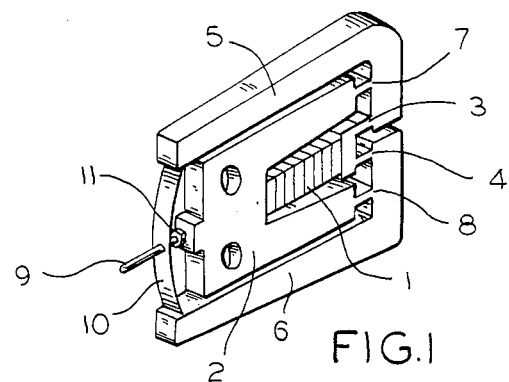
FIG. 1 is a perspective view of a printing hammer mechanism according to a first embodiment of the present invention.
Figure 2:
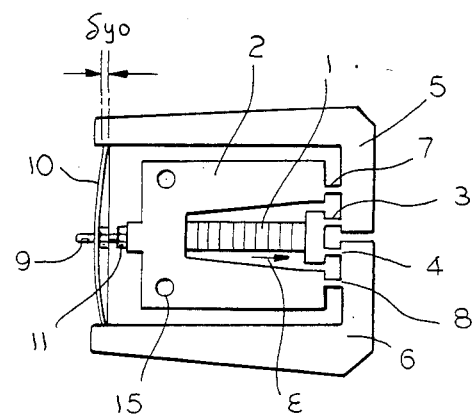
FIGS. 2 and 3 are side views of the printing hammer mechanism shown in FIG. 1.
Figure 3:
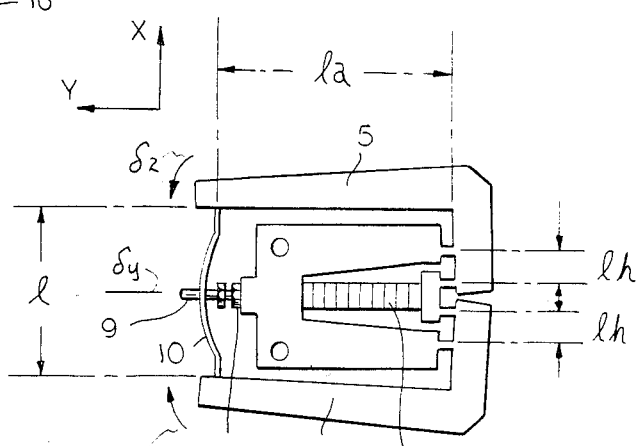

FIGS. 1, 2 and 3 show a printing head mechanism. An electostrictive or piezoelectric transducer element 1 is fixed to a base 2, element 1 being fixed at its one end in the expanding and contracting direction. Means 3, 4 for transmitting the expanding and contracting operation of the piezoelectric element 1 are provided at the other end of the element 1. Two L-shaped lever arms 5 and 6 are connected to the electrostrictive or piezoelectric elements 1 by way of the displacement transmission means 3 and 4, respectively. The lever arms 5 and 6 are connected to the base 2 via fulcrum means 7 and 8, respectively. Further, the fore ends of the lever arms 5 and 6 support a band spring 10. The band spring 10 has a printing needle 9, as an acting element, at its central part. An adjustment screw 11 is provided at the base 2, in a position corresponding to the rear face of the printing needle 9 in order to set the initial displacement of the band spring 10 and to function as a back stop. This mechanism is symmetrical about the axis of the element 1.

The base 2, the displacement transmission means 3 and 4, and the lever arms 5 and 6 are made of an integrated elastic material. These components can be mass-produced on a punch press, by etching or by a wire-cutting method. The electrostrictive or piezoelectric element 1 is formed by stacking a plurality of flat plates having a longitudinal displacement effect, such as titanate zirconate lead (PZT). The band spring 10 can also be supported on the lever arms 5 and 6 in either a rotatable or a fixed fashion. Further, the displacement transmission means 3 and 4 or the fulcrum means 7 and 8 can also be formed of pin joints with less wear, such as a ceramic-made fulcrum, for example.

When a voltage is applied to the electrostrictive or piezoelectric transducer element 1, the element 1 expands in its longitudinal direction. The displacement of the piezoelectric element 1 is transmitted to the respective lever arms 5 and 6 by way of the displacement transmission means 3 and 4. The lever arms 5 and 6 turn about the fulcrum means 7 and 8, in a symmetrical relation with respect to the axis of the piezoelectric element 1. As shown in FIG. 3, the lever arms 5 and 6 turn so that their fore ends approach each other. Thus, the displacement of the piezoelectric element 1 is enlarged by the lever arms 5 and 6. A displacement $\delta x$ is obtained in the X-direction, at the fore ends of the lever arms 5 and 6. Since the band spring 10 is held by both ends of the lever arms 5 and 6, the band spring 10 is bent in the Y-direction. This bending causes the maximum deflection $\delta y$, at the central portion of spring 10. Accordingly, the band spring 10 causes the printing needle 9 to protrude in the Y-direction to execute printing since initially the band spring 10 is slightly bent by the adjusting screw 11.

The stroke distance of the printing needle 9 is caused by the displacement of the electrostrictive or piezoelectric transducer element 1 on approximately a basis of the following relationship. As shown in FIG. 3, assume that the expansion of the electrostrictive or piezoelectric element 1 is $\epsilon$. The distance between the displacement transmission means 3 and 4 and the fulcrum means 7 and 8 of the lever arms 5 and 6 is $l_h$. The distance between the displacement transmission means 3 and 4 and the positions where the leaf spring 10 is joined to fore ends of the lever arms 5 and 6 is $l_a$. The expansion $\epsilon$ is amplified to $\epsilon l_a/l_h$ at the fore ends of the lever arms 5 and 6. Since two lever arms 5 and 6 are provided, the displacement of $\epsilon l_a/l_h$ is applied to both ends of the band spring 10. Therefore, the following equation is established with respect to the X-direction displacement $\delta x$ of the band spring 10:

$$\delta x = \frac{2\epsilon l_a}{l_h} \quad (1)$$

Next, the displacement Dx is applied in the X-direction to both ends of the band spring 10. The deflection Dy is applied in the Y-direction to the central portion of the band spring. Assume that the inherent length of the band spring 10 (i.e., the length in which no load is applied to the spring 10) in the X-direction is lo and that the length of the displacement Dx applied to the spring 10 is l(l=lo−Dx). Then, the following equation is established:

$$l_o = \int_o^l \left\{ 1 + \frac{1}{2}\left(\frac{Dy\pi}{l}\right)^2 \cos^2\pi\frac{x}{l} \right\} dx \quad (2)$$

$$= l + \frac{Dy^2\pi^2}{4l}$$

By substituting $l=l_o-Dx$ into the equation (2), the following equation is obtained:

$$Dy^2 = \frac{4Dx(lo-Dx)}{\pi^2} = \frac{4Dxlo}{\pi^2} \quad (\because lo >> Dx) \quad (3)$$

$$\therefore Dy = \frac{2}{\pi}\sqrt{Dxlo}$$

As shown in FIG. 2, the band spring 10 must be prebent in the Y-direction. If these initial displacements in the X- and Y-direction are assumed to be $\delta xo$ and $\delta yo$, respectively, the following equation is obtained from the equation (3);

$$\delta_{yo} = \frac{2}{\pi}\sqrt{\delta xolo} \quad (4)$$

$$\therefore \delta xo = \frac{\pi^2\delta^2 yo}{4lo}$$

Likewise, the deflection $\delta_y'$ in the Y-direction is caused by displacing the bank spring 10 a further displacement $\delta_x'$ in the X-direction. This band spring 10 deflection is represented as follows:

$$\delta_y' = \frac{2}{\pi}\sqrt{\delta_x' lo} \quad (5)$$

$$\delta_x' = \frac{\pi^2\delta_y'^2}{4lo}$$

The actual displacement and deflection $\delta x$ and $\delta y$ of the band spring 10 from the initial state to the driven state are represented as follows:

$$\delta x = \delta_x' - \delta_{xo} \quad (6)$$

$$\delta y = \delta_y' - \delta_{yo} \quad (7)$$

A substitution of the equations (4) and (5) into the equation (6) leads to the following equation:

$$\delta x = \frac{\pi^2}{4lo}(\delta_y'^2 - \delta_{yo}^2)$$

By substituting the equation (7) into the above equation, $$\delta x = \frac{\pi^2}{4l_o}(\delta_y^2 + 2\delta y \delta y o)$$

By solving the above equation for δy (>0), $$\delta y = \sqrt{\delta_{yo}^2 + \frac{4l_o}{\pi^2}\delta x} - \delta yo$$

A substitution of the equation (1) into the above equation leads to the following equation which represents the deflected amount δy at the central part of the band spring 10:

$$\delta y = \sqrt{\delta_{yo}^2 + \frac{8\epsilon l_a l_o}{\pi^2 l_h}} - \delta yo \quad (8)$$

In a concrete example of the above embodiment, the length of the piezoelectric element 1 is 18 mm, the distance $l_h$ between the displacement transmission means 3 and 4 and the fulcrum means 7 and 8 of the lever arms 5 and 6 is 3 mm, the distance $l_a$ from te displacement transmission means 3 and 4 to the fore ends of the lever arms 5 and 6 is 30 mm, the inherent length $l_o$ of the band spring 10 is 20 mm, the initial displacement δyo of the band spring 10 is 0.2 mm, and the expansion ε of the piezoelectric element is 0.01 mm. From equation (8), the theoretical deflection δy (i.e. the stroke distance) of the printing needle 9 becomes about 1.0 mm. Since this theoretical deflection δy is somewhat reduced due to the deformation loss of both the lever arms 5 and 6 and the base 2, the actual deflection is about 0.6 mm.

When the voltage applied to the piezoelectric element 1 is interrupted, the piezoelectric element 1 is restored to the initial length. Simultaneously, the lever arms 5 and 6 are also restored to their initial positions. Accordingly, the band spring 10 returns toward the adjusting screw 11.

In this amplification mechanism, the displacement transmission means 3 and 4, the fulcrum means 7 and 8 and the lever arms 5 and 6 are arranged symmetrically about the axis of the piezoelectric element 1. Therefore, bending forces and moments caused by the lever arms 5, 6 and applied to the piezoelectric element 1 become symmetrical about the longitudinal axis of the piezoelectric element 1. As a result, these bending forces imposed on the lever arms 5 and 6 offset each other and the piezoelectric element 1 will not be broken.

Figure 4:
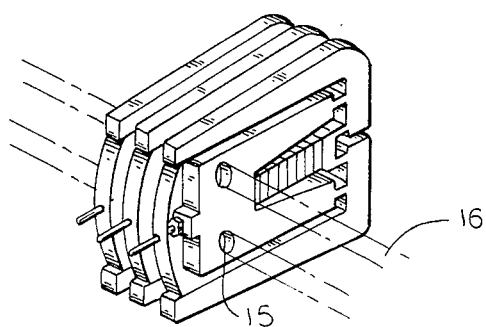
FIG. 4 is a perspective view of the printing hammer mechanism shown in FIG. 1 as applied to a printing hammer of a line printer.

The foregoing printing head mechanism can be used for a line printer. In this case, as shown in FIG. 4, a plurality of such mechanism are assembled in parallel and are fixed together by means of a base mounting means 16. The mounting means 16 engages screw holes 15 formed in the respective bases 2.

Figure 5:
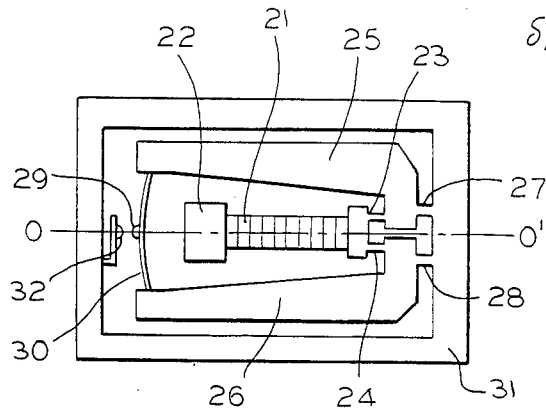
FIG. 5 is a perspective view of a relay mechanism according to a second embodiment of the present invention.
Figure 6:
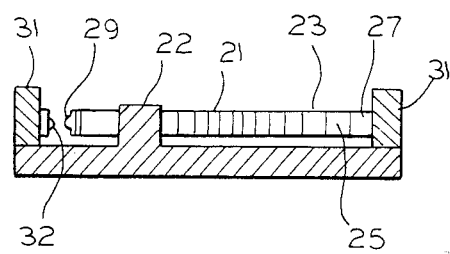
FIG. 6 is a sectional view taken along the line 0—0' in FIG. 5.

FIGS. 5 and 6 show the second embodiment in which the mechanical amplification mechanism is applied to a relay arrangement. One end of an electrostrictive or piezoelectric element 21 is fixed to a base 22 formed integrally with a frame 31. Displacement transmission means 23 and 24 are provided at the other end of the element 21. Two lever arms 25 and 26 are connected to the displacement transmission means 23, 24 and fulcrum means 27 and 28, respectively. The fulcrum means 27 and 28 are fixed to a frame 31, and arranged on the opposite sides of the transmission means 23 and 24 with respect to the lever arms 25 and 26. The fore ends of the lever arms 25 and 26 hold a band spring 30. A movable contact 29 is an acting element provided at the central portion of the band spring 30. A fixed electric contact 32 is provided on the frame 31 in a position opposite the movable contact 29.

Also in such a mechanism, the lever arms 25 and 26 are driven by the expanding and contracting operation of the piezoelectric element 21. Accordingly, the buckling deformation of the leaf spring 30 causes the movable contact 29 to come into contact with the fixed contact 32, thereby effecting the relay operation. This relay arrangement has a great contact displacement and pressure. Therefore, a long lifetime and a high reliability can be obtained.

According to the present invention, as described above, a mechanical amplification mechanism is small in size, large in the displacement amplificaiton and has a long lifetime as well as a high reliability.

What is claimed is:

1. A mechanical amplification mechanism comprising:
    an elongated strictive transducer element capable of expanding and contracting in a longitudinal direction when a voltage is applied thereto;
    a base member for fixedly holding one end of said strictive transducer element for enabling a movement thereof in said longitudinal direction;
    two lever arms for converting said expanding and contracting motion of said strictive transducer element into a rotational motion, first ends of each of said lever arms engaging the other end of said strictive transducer element and fulcrum means for supporting said lever arms near said first end; and
    a belt-like elastic member provided between second ends of said two lever arms, said elastic member having an acting element at the central portion thereof,
    the directions of rotations of said two lever arms being substantially summetrical about the longitudinal center axis of said strictive transducer element.

2. The mechanical amplification mechanism as claimed in claim 1, wherein each of said lever arms is formed in an L-shape, and the direction of forces caused by said strictive transducer element upon said first end of said lever arm is substantially orthogonal to the moving direction of said second end.

3. The mechanical amplification mechanism as claimed in claim 1, wherein said acting element is a printing needle.

4. The mechanical amplification mechanism as claimed in claim 3, wherein a plurality of said mechanical amplification mechanism are arranged in parallel and connected together at said base member.

5. The mechanical amplification mechanism as claimed in claim 1, wherein said acting element is an electric contact, and a fixed contact is provided in a position opposite to said electric contact.

6. The mechanical amplification mechanism as claimed in claim 1, wherein said base members, fulcrums and said two lever arms are integrally made of the same material so as to be connected together.

7. The mechanism of claim 1 wherein said strictive element is an electrostrictive element.

8. The mechanism of claim 1 wherein said strictive element is a piezoelectric element.

9. A mechanical amplification structure comprising a pair of lever arms mounted for rotational motion about individually associated pivot points, an elongated transducer means which expands or contracts along its longitudinal axis responsive to electrical signals, said transducer being coupled to swing said lever arms about said pivot points such that said lever arms are symetrically arranged about said longitudinal axis whereby an excursion distance between the swinging ends of said lever arms is equal to the expansion or contraction of said transducer multiplied by an effective length of said lever arms, elastic means coupled between the swinging ends of said arms to experience controlled mechanical excursions responsive to said electrical signals, and mechanical actuator means on said elastic means for giving a mechanical function responsive to an operation of said elastic means by the moving ends of said arms.

10. The mechanical structure of claim 9 wherein said mechanical actuator means is a printing needle.

11. The mechanical structure of claim 9 wherein said mechanical actuator means is an electrical contact.

12. The mechanical structure of claim 9, wherein there are a plurality of said structures positioned adjacent each other to operate an aligned plurality of said mechanical actuator means.

13. The mechanical structure of claim 9 wherein each of said lever arms has approximately an "L-shape," with the long ends of said L-shapes being approximately parallel to each other and the short ends of the L-shapes pointing toward each other, said transducer being connected to the short ends of said L-shapes, and said pivot points being located near the angular junction between the long and short ends of said L-shapes.

14. The mechanical structure of claim 9 comprising a unitary base member having an elongated window formed therein, a pair of relatively thin hinge sections formed near one end of said elongated window, a pair of oppositely disposed L-shaped members attached to individually associated ones of said hinge sections, the long end of said L-shapes being approximately parallel to each other and the short ends of the L-shapes pointing toward each other, said transducer being connected at one end to said bass member with the other end of said transducer being connected to the short ends of said L-shapes.

15. The mechanical structure of claim 14 wherein said mechanical actuator means is a printing needle.

16. The mechanical structure of claim 14 wherein said mechanical actuator means is an electrical contact.

17. The mechanical structure of claim 14, wherein there are a plurality of said structures positioned adjacent each other to operate an aligned plurality of said mechanical actuator means.

* * * * *